US009199255B2

(12) United States Patent
Zahn et al.

(10) Patent No.: US 9,199,255 B2
(45) Date of Patent: Dec. 1, 2015

(54) VARIABLE LENGTH FLUSH NOZZLES FOR WIRE ELECTRICAL DISCHARGE MACHINES

(75) Inventors: Harry Zahn, Greer, SC (US); Charles Dunn, Marietta, SC (US); Jeff Estes, Greer, SC (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 368 days.

(21) Appl. No.: 13/600,005

(22) Filed: Aug. 30, 2012

(65) Prior Publication Data

US 2014/0061164 A1    Mar. 6, 2014

(51) Int. Cl.
*B23H 7/10*     (2006.01)
*B05B 15/06*    (2006.01)
*B05B 7/22*     (2006.01)
*B05B 12/12*    (2006.01)

(52) U.S. Cl.
CPC ............... *B05B 7/224* (2013.01); *B05B 15/068* (2013.01); *B23H 7/101* (2013.01); *B05B 12/124* (2013.01)

(58) Field of Classification Search
CPC .............................. B23H 7/101; B05B 15/068
USPC .............. 219/69.12, 69.14; 285/145.1, 147.3; 239/541
See application file for complete search history.

(56) References Cited

U.S. PATENT DOCUMENTS

| | | | |
|---|---|---|---|
| 2,483,395 A * | 10/1949 | Benson | 403/105 |
| 4,226,520 A * | 10/1980 | Uesugi | 396/79 |
| 4,414,456 A | 11/1983 | Inoue | |
| 4,507,532 A * | 3/1985 | Inoue | 219/69.12 |
| 4,628,172 A * | 12/1986 | Inoue | 219/69.12 |
| 4,634,825 A * | 1/1987 | Budin et al. | 219/69.12 |
| 4,739,144 A * | 4/1988 | Shibata et al. | 219/69.12 |
| 4,814,574 A | 3/1989 | Babel et al. | |
| 4,896,013 A | 1/1990 | Fricke et al. | |
| 5,073,690 A | 12/1991 | Corbin et al. | |
| 5,214,260 A | 5/1993 | Fricke | |
| 5,384,443 A | 1/1995 | Swartzbaugh | |
| 5,585,013 A | 12/1996 | Truty | |
| 6,398,135 B1 * | 6/2002 | Hsiao | 239/526 |

FOREIGN PATENT DOCUMENTS

| | | | |
|---|---|---|---|
| EP | 1481751 A1 | * | 12/2004 |
| JP | 59-166426 A | * | 9/1984 |
| JP | 60-071123 A | * | 4/1985 |

(Continued)

OTHER PUBLICATIONS

Machine translation of Japan Patent document No. 2004-098,240, Apr. 2015.*

*Primary Examiner* — Geoffrrey S Evans
(74) *Attorney, Agent, or Firm* — Ingrassia Fisher & Lorenz, PC

(57) ABSTRACT

Variable length flush nozzles for wire electric discharge machining (wire EDM) are provided. The variable length flush nozzle comprises an elongated body having an internal channel and a nozzle head having a pair of opposed slots formed therein. The nozzle head is coupled to the elongated body by a retention element dimensioned and configured for operative engagement with the pair of opposed slots such that the nozzle head is slidable relative to the elongated body between a fully extended position in which the variable length flush nozzle is at a maximum length and a fully retracted position in which the variable length flush nozzle is at a minimum length.

20 Claims, 7 Drawing Sheets

(56) References Cited

FOREIGN PATENT DOCUMENTS

| | | | | |
|---|---|---|---|---|
| JP | 61-061717 A | * | 3/1986 | |
| JP | 63-011226 A | * | 1/1988 | |
| JP | 63-016924 A | * | 1/1988 | |
| JP | 02-152724 A | * | 6/1990 | |
| JP | 2-152724 A | * | 6/1990 | |
| JP | 4-111716 A | * | 4/1992 | |
| JP | 4-365514 A | * | 12/1992 | |
| JP | 2004-098240 A | * | 4/2004 | |

* cited by examiner

VARIABLE LENGTH FLUSH NOZZLES FOR WIRE ELECTRICAL DISCHARGE MACHINES

TECHNICAL FIELD

The present invention generally relates to manufacturing components using Wire Electrical Discharge Machining (Wire EDM), and more particularly relates to variable length flush nozzles for Wire Electrical Discharge Machines.

BACKGROUND

Wire electric discharge machining (hereinafter referred to as "Wire EDM" or "WEDM"), also called Traveling Wire EDM, Wire Cutting or Wire Burning uses spark erosion to machine or remove electrically conductive material from a conductive workpiece with a continuous traveling electrode wire. The electrically conductive material is machined with a series of electrical discharges (sparks) that are produced between the electrode wire (the electrode) and the conductive workpiece. High frequency pulses of alternating or direct current are discharged from the electrode wire to the conductive workpiece with a very small spark gap through an insulated dielectric liquid. The heat of each electrical discharge (spark) erodes away a tiny bit of the electrically conductive material forming particles (also known as "chips") that are vaporized and melted from the conductive workpiece in a cutting zone. These particles (chips) are flushed away from the cutting zone with a stream of the dielectric liquid through at least one flush nozzle in a wire EDM machine. The dielectric liquid also cools the electrode wire and prevents heat build-up in the conductive workpiece.

Higher cutting speeds and precision in wire EDM are ever increasing demands. The goal of higher cutting speed is dependent on the extent to which optimum conditions in the cutting zone may be established. Among other factors which govern these conditions, it has been recognized that adequate chip flushing is of particular importance. It is necessary that the cutting zone be flushed with the dielectric liquid in a sufficient volume and at a sufficiently high flow rate, yet uniformly along its entire length, i.e. across the thickness of the conductive workpiece, to allow the erosive action to continue with stability, the cutting chips and other erosive products to be carried away promptly from the cutting zone, and the electrode wire subject to erosive heating to be cooled with greater effectiveness. An orifice of the flush nozzle for delivering the dielectric liquid should be positioned as close as possible to the conductive workpiece to provide such adequate chip flushing. A conventional flush nozzle has a fixed length and therefore the orifice position of a conventional flush nozzle is not controllable once the conventional wire EDM machine has been configured. A conductive workpiece that has a flat top surface and a flat bottom surface permits tight nozzle contact for the best chip flushing. However, when the conductive workpiece top surface and/or bottom surface is not smooth or flat (i.e., the conductive workpiece has an irregular shape and/or surface that is not perpendicular to the electrode wire, i.e., is oblique), the ability of conventional flush nozzles to flush out the chips may be poor, resulting in decreased wire EDM efficiency.

Accordingly, it is desirable to provide variable length flush nozzles for wire EDM machines. It is also desirable that the length of the variable length flush nozzle automatically adjusts during wire EDM to maintain an orifice of the flush nozzle against the conductive workpiece regardless of the shape and/or surface thereof, resulting in improved chip flushing and an ability to wire EDM at the highest possible speed and precision. Furthermore, other desirable features and characteristics of the present invention will become apparent from the subsequent detailed description of the present invention and the appended claims, taken in conjunction with the accompanying drawings and this background of the invention.

BRIEF SUMMARY

A variable length flush nozzle is provided. In accordance with one exemplary embodiment, the variable length flush nozzle comprises an elongated body having an internal channel and a nozzle head having a pair of opposed slots formed therein. The nozzle head is coupled to the elongated body by a retention element. The retention element is dimensioned and configured for operative engagement with the pair of opposed slots such that the nozzle head is slidable relative to the elongated body between a fully extended position in which the variable length flush nozzle is at a maximum length and a fully retracted position in which the variable length flush nozzle is at a minimum length.

A variable length flush nozzle for a wire EDM machine is provided in accordance with yet another exemplary embodiment of the present invention. The variable length flush nozzle for a wire EDM machine comprises an elongated body and a nozzle head. The elongated body has an inlet end, an outlet end, and an internal channel configured to carry a dielectric liquid for cutting a conductive workpiece by electroerosion by means of an electrode wire. The internal channel is adapted to be connected to a source of dielectric liquid. The nozzle head has a frustoconical tip portion with an orifice and a lower portion defined by a peripheral wall having a pair of opposed slots formed therein. The lower portion of the nozzle head is coupled to the outlet end of the elongated body by a retention element. The retention element is dimensioned and configured for operative engagement with the pair of opposed slots such that the nozzle head is slidable relative to the outlet end of the elongated body between a fully extended position in which the variable length flush nozzle is at a maximum length and a fully retracted position in which the variable length flush nozzle is at a minimum length.

A wire EDM machine is provided in accordance with yet another exemplary embodiment of the present invention. The wire EDM machine comprises a pair of flush nozzles adapted to be disposed at opposite sides of a conductive workpiece and to deliver a dielectric liquid individually toward the conductive workpiece while permitting insertion of an electrode wire therethrough in the axial direction thereof coincident with delivery of the dielectric liquid into a cutting zone in the conductive workpiece. At least one of the flush nozzles of the pair of flush nozzles comprises a variable length flush nozzle. The variable length flush nozzle comprises an elongated body having an internal channel and a nozzle head having a pair of opposed slots formed therein. The nozzle head is coupled to the elongated body by a retention element dimensioned and configured for operative engagement with the pair of opposed slots such that the nozzle head is slidable relative to the elongated body between a fully extended position in which the variable length flush nozzle is at a maximum length and a fully retracted position in which the variable length flush nozzle is at a minimum length.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various exemplary embodiments are directed to a variable length flush nozzle for a wire electric discharge machine (hereinafter sometimes referred to as a "wire EDM machine"). The variable length flush nozzle is particularly useful for wire electric discharge machining (Wire EDM or WEDM) of a conductive workpiece having an irregular shape and/or surface. Wire EDM is used to manufacture high precision components such as, for example, complex aerospace and medical components. As used herein, the term "conductive workpiece" refers to a workpiece made from an electrically conductive material such as, for example, metals, metallic alloys, graphite, or even some ceramic materials, irrespective of their hardness. As used herein, the term "irregular shape and/or surface" refers to a contoured and/or angled (i.e., oblique) workpiece cutting surface that is not perpendicular to the electrode wire, as hereinafter described. The term "electrode wire" has been used in the art and used herein to refer to a thin, continuous elongate electrode element generally and to include not only a conductive wire which may be circular, triangular, square, rectangular or polygonal in cross section but a like continuous element in the form of a conductive tape or ribbon. The variable length flush nozzle according to exemplary embodiments improves chip flushing when wire electric discharge machining (wire EDM) a conductive workpiece having an irregular shape and/or surface as tight nozzle contact against the conductive workpiece can be maintained.

Figure 1:
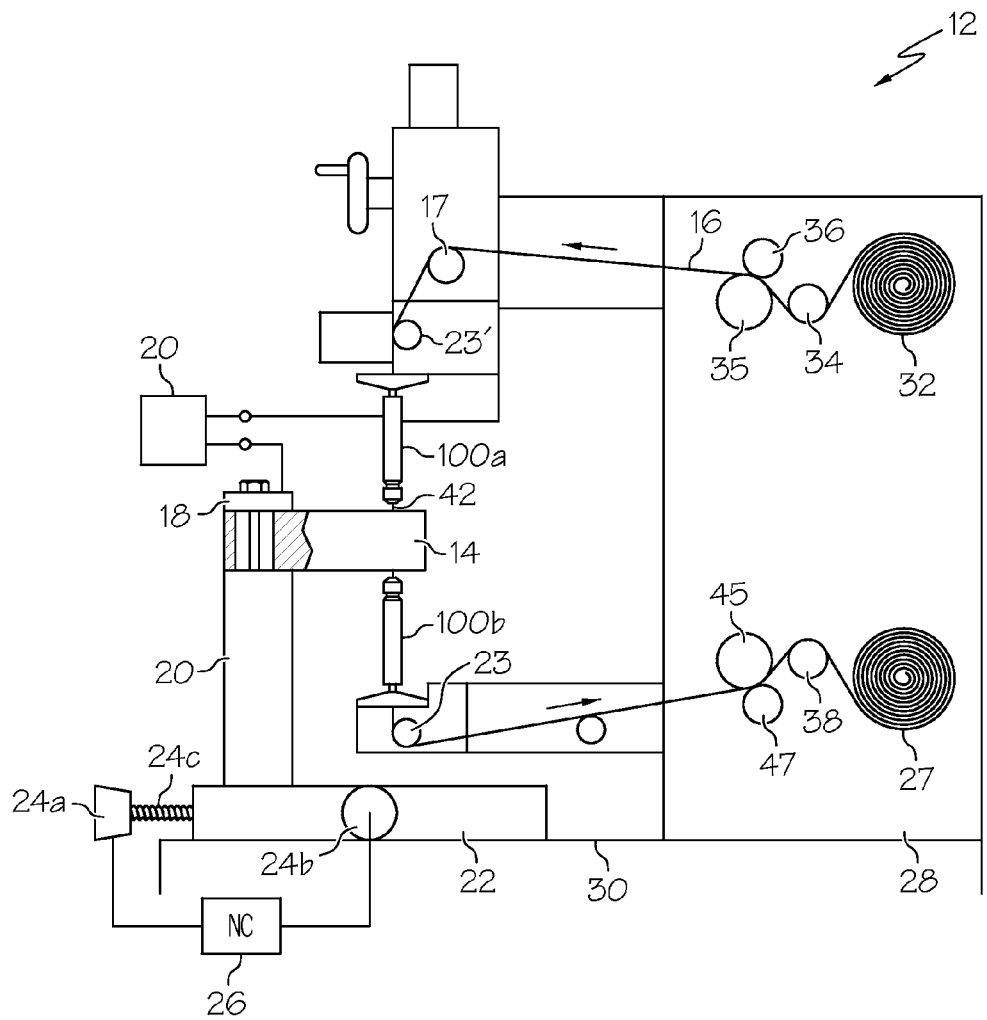
FIG. 1 is a diagrammatic side elevation view of an exemplary wire EDM machine including a pair of variable length flush nozzles, according to exemplary embodiments of the present invention.
Figure 2:
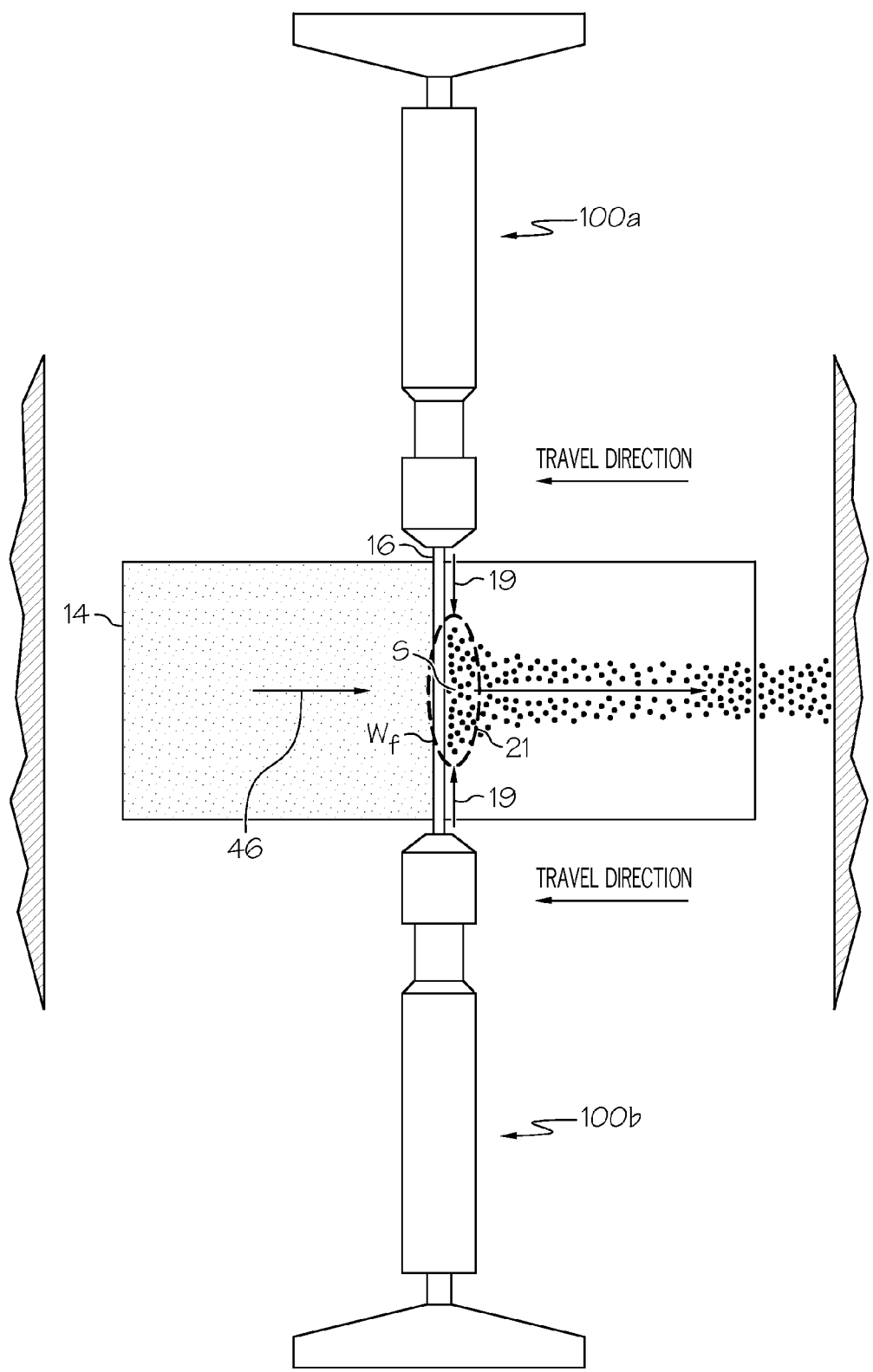
FIG. 2 is a schematic view of chip flushing in the wire EDM machine of FIG. 1.

FIG. 1 is a diagrammatic side elevational view of an exemplary wire EDM machine 12 for machining a conductive workpiece 14 with a continuous electrode wire 16 which is continuously transported through the workpiece, downwards in the illustrated arrangement (FIG. 2). The conductive workpiece is connected by a bolt clamp 18 and a support post 20 to a worktable 22 capable of being driven incrementally in two mutually perpendicular directions by motors 24a and 24b and respective lead screws, one of which has been shown as 24c in FIG. 1, the motors being controlled by an NC (numerical control) unit 26 representing any computer or programmable unit capable of generating the desired cut contour in the conductive workpiece. A tool post 28 rises from a base 30 upon which the worktable 22 is movably mounted in the manner described and carries, as has been shown highly diagrammatically, a supply spool 32 of the traveling-electrode wire 16 which passes a tensioning roller 34 and between a pair of driven pinch rollers 35, 36 whose drive can be coupled to the drive of a pair of pinch rollers 45, 47 at the takeup side to maintain a predetermined tension in the wire. A linear stretch of the traveling wire is established between a pair of guide rollers 23, 23' and a wire is deflected into this linear stretch by a deflection roller 17. A roller 38 can serve to measure the utilization of the electrode wire and can be used as a control for the rate of feed thereof in the wire travel direction which is downwardly in FIGS. 1 and 2. Over its linear stretch (best illustrated in FIG. 2), the wire passes through a pair of variable length flush nozzles 100 straddling the workpiece. The pair of variable length flush nozzles 100 (the upper flush nozzle identified with reference numeral 100a and the lower flush nozzle identified with reference numeral 100b). For convenience of explanation, terms of direction will be utilized in the following description, such as "upper", "lower", and the like, corresponding to the orientation of the illustrate variable length flush nozzle. It should be understood, however, that the orientation of the variable length flush nozzle can be varied in three-dimensional space. While both the upper and lower flush nozzles in FIGS. 1 and 2 are illustrated as variable length flush nozzles 100 (illustrated in FIGS. 3 through 8 in more detail), it is to be understood that one of the upper or lower flush nozzle may comprise a conventional flush nozzle although preferably both flush nozzles comprise variable length flush nozzles. It is also to be understood that one or both of the upper and lower flush nozzles in FIGS. 1 and 2 may be a variable length flush nozzle 200 (FIG. 11), i.e., the variable length flush nozzle 100 and/or variable length flush nozzle 200 according to exemplary embodiments as described herein may replace one or both of the conventional flush nozzles used in most wire EDM machines.

Referring now specifically to FIG. 2, each variable length flush nozzle 100 has an orifice or nozzle opening 15 (shown best in FIGS. 3 and 10), respectively, for individually delivering a cutting liquid medium 19 into a cutting zone (encircled region 21) defined with the traveling electrode wire 16 in the workpiece 14 while cooling the conductive workpiece 14 and the electrode wire 16. The cutting liquid medium (shown by arrows 19 in FIG. 2) is a dielectric liquid, e.g. deionized water or water ionized to a varying extent to serve as a desired electroerosive cutting medium. The workpiece is disposed in a bath of the cutting liquid medium to immerse the cutting zone therein. Both nozzle openings 15 of the upper and lower flush nozzles, are shown as coaxial with the electrode wire 16 passing therethrough. The upper and lower flush nozzles are arranged essentially coaxially with one another and thus have their axes coincident with a desired path of travel of the electrode wire 16 through the conductive workpiece 14.

Still referring to FIG. 2, it can be seen that the electrode wire 16 passes through the conductive workpiece 14 and forms a cut therein which is in the form of a slot S lying behind the wire. The conductive workpiece is fed in the direction 46 which is perpendicular to the wire travel direction as noted previously. The conductive workpiece has the cutting slot S electroerosively formed therein behind the electrode wire as the wire is effectively moved translationally, here from right to left, in and relative to the conductive workpiece in the course of cutting feed displacement of the latter by means of the motors and the feed controller (not shown). Electroerosion current is passed between the electrode wire traveling through the conductive workpiece and a portion of the workpiece adjacent thereto across a narrow erosion gap is flushed with the cutting liquid medium. A cutting front, thus progressively formed in the workpiece 14, has a semi-cylindrical surface equally spaced from the electrode wire with the erosion gap spacing and is designated by reference Wf. The cutting front Wf and hence the cutting slot S have a narrow width, equal to the diameter of the electrode wire 16 plus twice the erosion gap spacing and thus slightly greater than the thickness of the electrode wire 16. As the cutting slot S is contiguous with the cutting front Wf, the cutting liquid medium injected or delivered into the cutting zone from the two flush nozzles 100a and 100b disposed at the opposite sides of the conductive workpiece 14 tends to flow out through the cutting slot S. As illustrated in FIG. 2, the dielectric liquid and the chips formed from eroding away a bit of electrically conductive material from the workpiece meet in the middle of the cut where the chips move around the electrode wire, and out the path that was already cut.

FIGS. 3 through 10, according to exemplary embodiments, illustrate variable length flush nozzle 100 in more detail. Again, for convenience of explanation, terms of direction will be utilized in the following description of the variable length flush nozzle, such as "upper", "lower" and the like, corresponding to the orientation of the variable length flush nozzle shown in FIGS. 3 through 11. It should be understood, however, that the orientation of the variable length flush nozzle can be varied in three-dimensional space (see, e.g., the upper flush nozzle in FIGS. 1 and 2) and thus is largely arbitrary.

Figure 3:
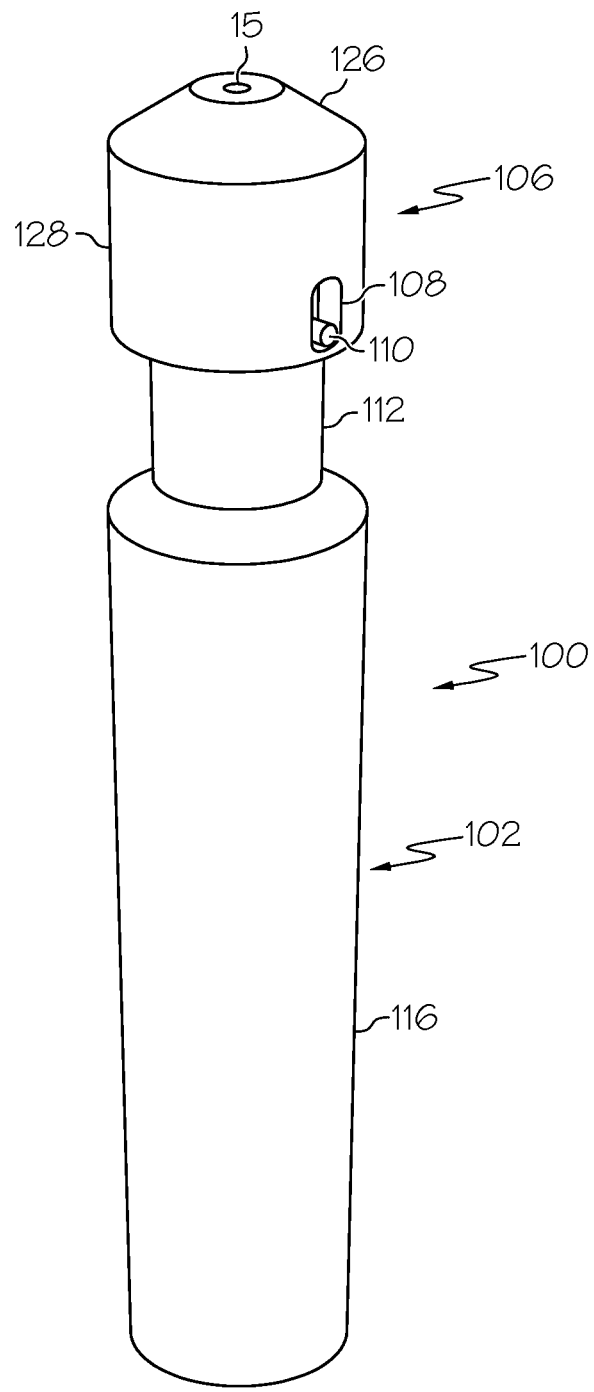
FIG. 3 is an isometric view of one of the variable length flush nozzles of FIGS. 1 and 2, according to exemplary embodiments, illustrating a nozzle head thereof in a fully extended position relative to an elongated body thereof.
Figure 4:
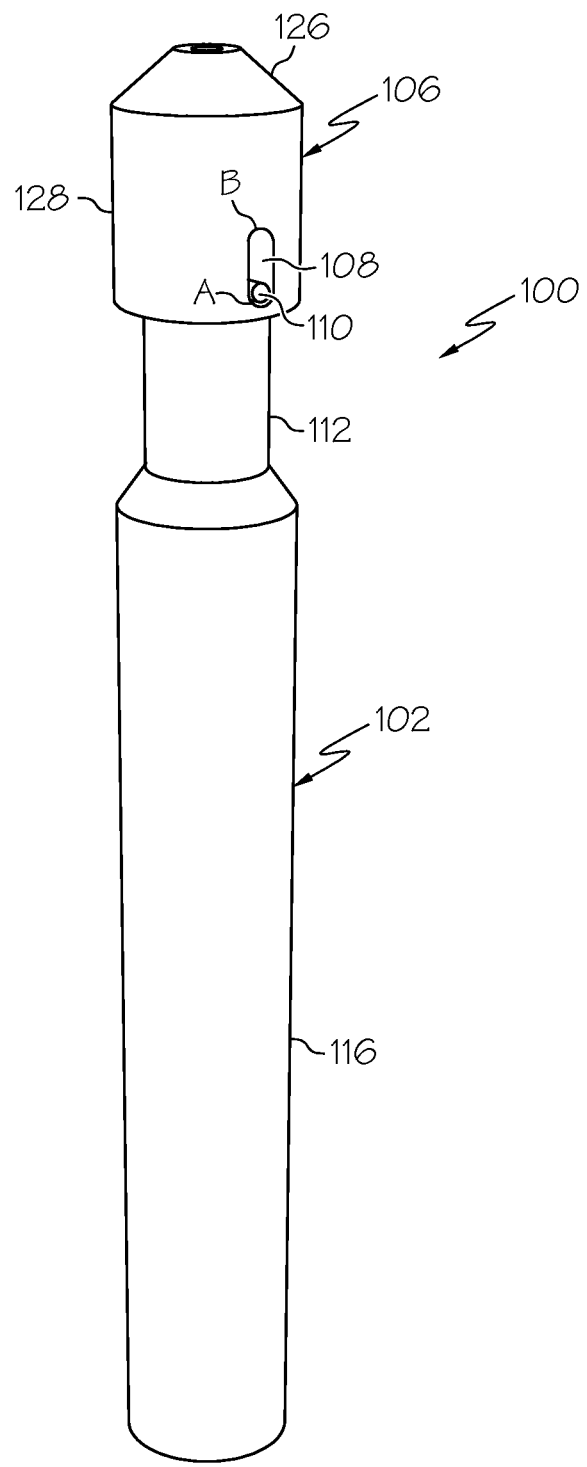
FIG. 4 is a perspective view of the variable length flush nozzle of FIG. 3.
Figure 5:
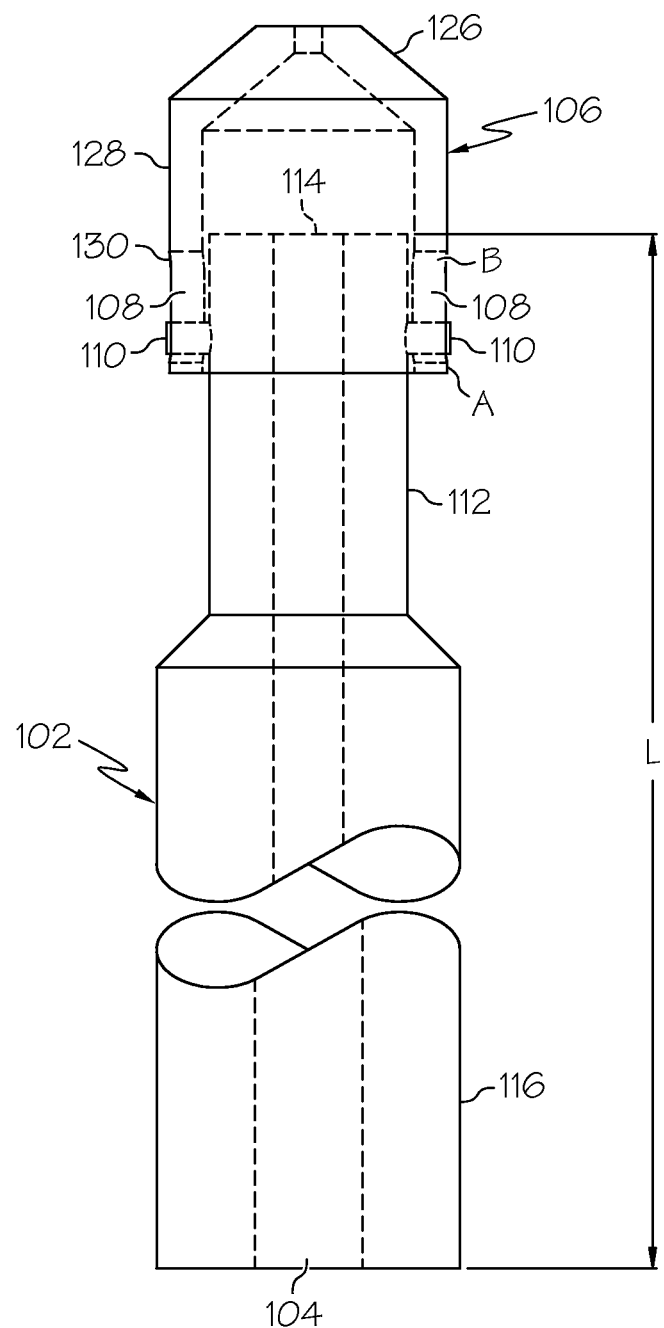
FIG. 5 is a view of the variable length flush nozzle of FIG. 3, illustrating the nozzle head slidably coupled onto an upper portion (shown in dotted lines) of the elongated body, the upper portion having a pair of circumferentially diametrically opposed flanges extended outwardly to operatively engage with a pair of opposed slots in a peripheral wall of the nozzle head.

The variable length flush nozzle 100 comprises an elongated body 102 having an internal channel 104 (shown in FIGS. 5 through 9) and a nozzle head 106 having a pair of opposed slots 108 formed therein (only one slot of the pair of opposed slots is shown in FIGS. 3 and 4), the nozzle head coupled to the elongated body by a retention element (a pair of opposed flanges 110) dimensioned and configured for operative engagement with the pair of opposed slots 108 such that the nozzle head 106 is slidable relative to the elongated body 102 between a fully extended position in which the variable length flush nozzle is at a maximum length (FIGS. 3-6, and 8) and a fully retracted position in which the variable length flush nozzle is at a minimum length (FIG. 7) as hereinafter described.

Figures 6, 7:
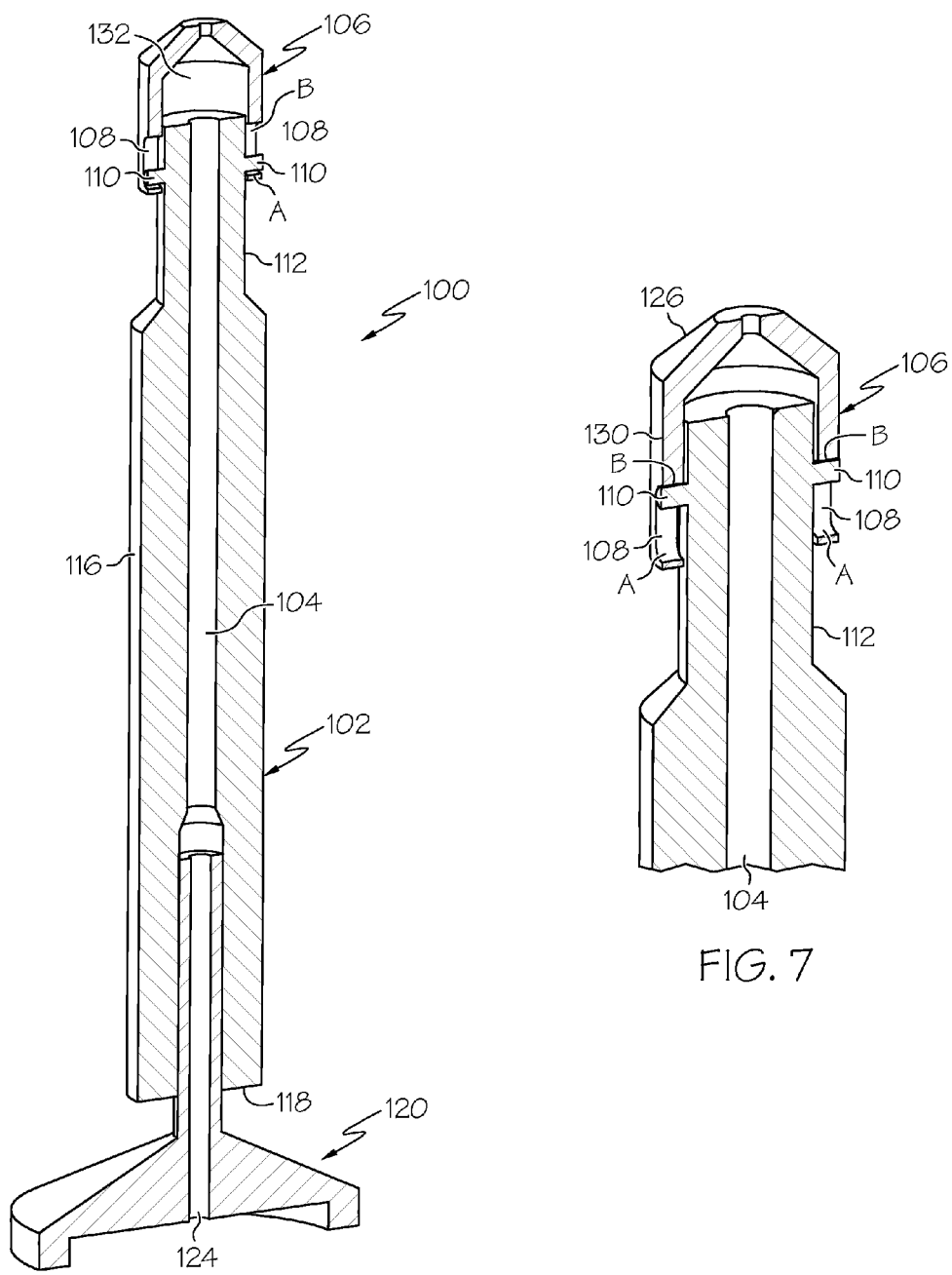
FIG. 6 is a cross-sectional view of the variable length flush nozzle of FIG. 3 detachably connected to a conventional base (also shown in cross-section) of a wire EDM machine such as illustrated in FIG. 1.
FIG. 7 is a cross-sectional view of a portion of the variable length flush nozzle of FIG. 3, illustrating the nozzle head thereof in a retracted position relative to the elongated body (the upper portion) of the variable length flush nozzle.

The elongated body 102 further has an upper portion 112 terminating in an outlet end 114 (FIG. 5), a lower portion 116, and the internal channel 104 formed therein that extends substantially the length of the elongated body. The elongated body is adapted to be detachably connected at an inlet end 118 (FIG. 6) of the lower portion to a nozzle base 120 of the EDM machine. An exemplary nozzle base is illustrated in FIG. 6. It is to be understood that the nozzle base may have other shapes and configurations. An internal channel inlet end 122 is adapted to be in fluid communication with a source (not shown) of the dielectric liquid that is supplied through an inner flowpath 124 in the nozzle base 120 (FIG. 6). The inner flowpath 124 is in fluid communication with the internal channel 104 in the elongated body. In the illustrated embodiment, the elongated body 102 has a substantially cylindrical cross section, with the upper portion thereof smaller in diameter than the lower portion of the elongated body. However, it is to be understood that the shape and configuration of the elongated body, as well as the length L thereof (FIG. 5), may vary according to exemplary embodiments. The internal channel 104 extends along the interior of the elongated body and is in fluid communication with the orifice 15 at an outlet end of the nozzle head, as hereinafter described. The internal channel 104 has a generally cylindrical cross section that may narrow at an upper portion thereof to improve flushing pressure and flow of the dielectric liquid therethrough. The elongated body 102 may be formed of either nonconductive material or conductive material which can be readily fabricated, but if formed of conductive material, it must be electrically isolated in some manner from the wire EDM machine so that the variable length flush nozzle does not act as an electrode and thus accidentally be machined by the electrode wire. As noted above, in an embodiment, the retention element comprises a pair of circumferentially diametrically opposed flanges 110 (only one of the opposed flanges is shown in FIGS. 3 and 4) may extend outwardly from the upper portion of the elongated body, for purposes as hereinafter described. The elongated body and the retention element may comprise a single unitary structure such as when the retention element comprises a pair of opposed flanges extending outwardly from the upper portion of the elongated body. In other embodiments, the retention element may comprise a pair of retention pins, as hereinafter described.

Figure 8:
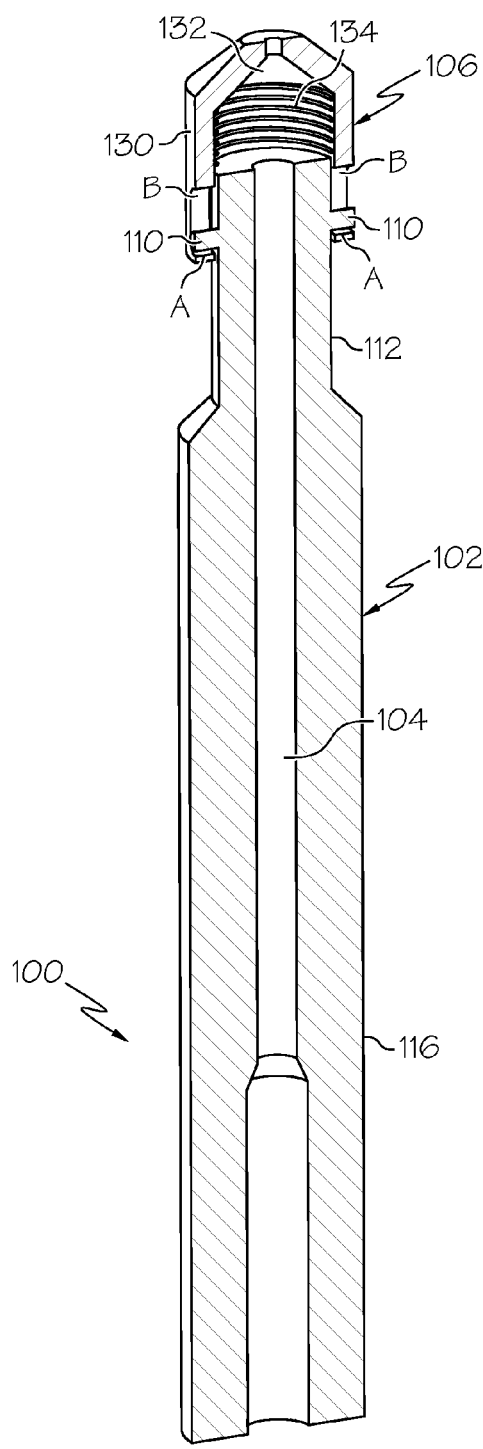
FIG. 8 is a cross-sectional view of a portion of the variable length flush nozzle of FIG. 3, illustrating an optional mechanical spring in an interior chamber of the nozzle head.
Figure 9:
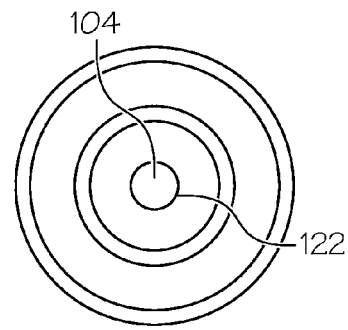
FIG. 9 is a bottom view of the variable length flush nozzle of FIG. 3.
Figure 10:
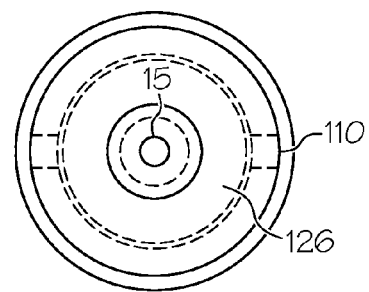
FIG. 10 is a top view of the variable length flush nozzle of FIG. 3.

Still referring to FIGS. 3 through 8, the nozzle head 106 comprises a frustoconical tip portion 126 and a substantially cylindrical lower portion 128 defined by a peripheral wall 130 having the pair of opposed slots 108 formed therein. The frustoconical tip portion 126 includes the outlet end of the nozzle head 106 that is generally frustoconical in shape having a normally smaller end defining the orifice 15. FIG. 10 is a top view of the variable length flush nozzle 100, including the frustoconical tip portion. The substantially cylindrical lower portion includes the inlet end of the nozzle head that is slidably coupled to the upper portion of the elongated body. Referring again to FIGS. 3 through 8, the pair of diametrically opposed slots 108 is provided in the peripheral wall of the nozzle head adjacent the inlet end thereof (only one of the opposed slots is shown in FIGS. 3 and 4). Referring now specifically to the cross-sectional views of FIGS. 6 through 8, an internal chamber 132 for flow through of the dielectric liquid is provided in the lower portion of the nozzle head between the top of the elongated body (that forms the bottom of the internal chamber) and the frustoconical tip portion. In an embodiment, as illustrated in FIG. 8, the variable length flush nozzle may further comprise a mechanical spring 134 inside the internal chamber 132 of the nozzle head, for purposes as hereinafter described.

As illustrated in FIGS. 3 through 8, in an embodiment, the nozzle head 106 is slidably received onto the upper portion 112 of the elongated body. In this embodiment, the internal diameter (ID) of the inlet end (lower portion) of the nozzle head is closely toleranced to the outer diameter of the upper portion of the elongated body, permitting the nozzle head to slide axially on the upper portion of the elongated body. A clearance fit with a tolerance of about 0.000 inches to about 0.0005 inches may be used, although it should be understood that other tolerances may be used as long as the inner diameter of the lower portion of the nozzle head slide fits over the outer diameter of the upper portion of the elongated body. The tolerances are also selected to permit the retention element to be positioned and retained in the pair of opposed slots defined in the peripheral wall of the lower portion of the nozzle head, and to substantially prevent the dielectric liquid from leaking between the nozzle head and the elongated body.

As noted above, the nozzle head 106 and elongated body 102 are coupled together by the retention element. In an embodiment, as illustrated in FIGS. 2 through 7, the retention element comprises the pair of diametrically opposed flanges 110 that extend outwardly from the upper portion of the elongated body. As noted above, the elongated body including the pair of diametrically opposed flanges may be a single integral unitary structure. As noted above, the upper portion of the elongated body includes the pair of circumferentially opposed flanges for cooperating with the complementary opposed slots formed in the peripheral wall of the nozzle head. The pair of flanges becomes engaged in the opposed slots upon coupling the nozzle head and elongated body. While diametrically opposed flanges and slots are illustrated, it is to be understood that the opposed flanges and opposed slots may be other than diametrically opposed.

Figure 11:
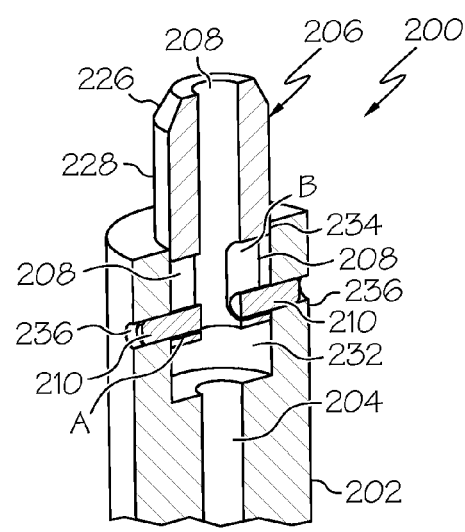
FIG. 11 is a cross-sectional view of an alternate embodiment of a variable length flush nozzle, according to exemplary embodiments.

Turning now to FIG. 11, in accordance with another exemplary embodiment of the present invention, a variable length flush nozzle 200 having a portion of the nozzle head internal to the elongated body is illustrated. For convenience of explanation, terms of direction will be utilized in the following description of the variable length flush nozzle 200, such as "upper", "lower" and the like, corresponding to the orientation of the variable length flush nozzle shown in FIG. 11. It should be understood, however, that the orientation of the variable length flush nozzle 200 can be varied in three-dimensional space and thus is largely arbitrary. The variable length flush nozzle 200 shares some structural similarities with the variable length flush nozzle 100 of FIGS. 3 through 10. Identical reference numbers indicate structures of similarity so as to require little or no additional description. The variable length flush nozzle 200 comprises a substantially cylindrical elongated body 202 in which an internal channel 204 thereof partially extends the length thereof from the inlet of the internal channel (not shown in FIG. 11) to an internal chamber 232. A central bore 234 is provided in the upper portion of the elongated body. Opposed openings 236 are formed in a peripheral wall of the substantially cylindrical elongated body adjacent an outlet end of the elongated body for purposes as hereinafter described.

A nozzle head 206 of variable length flush nozzle 200 comprises a frustoconical tip portion 226, a substantially cylindrical lower portion 228, and an internal flowpath 208 that is coaxial with the internal channel 204 in the elongated body portion. The substantially cylindrical lower portion of the nozzle head is slidably received in the central bore 234 in the upper portion of the elongated body. The internal chamber 232 is defined by the elongated body 202 having the internal channel 204 therein and the bottom of the nozzle head. While not illustrated, the mechanical spring 134 may be disposed in the internal chamber of variable length flush nozzle 200 of FIG. 11, for purposes as hereinafter described. The central bore 234 is dimensioned to slidably receive the inlet end of the nozzle head. The outer diameter of the inlet end of the nozzle head is closely toleranced to the internal diameter of the bore in the outlet end of the elongated body, but allows clearance permitting the nozzle head to slide axially therein for purposes as hereinafter described. The tolerances may be about −0.001 inches to 0 inches. A pair of opposed slots 208 is formed in the peripheral wall of the lower portion of the nozzle head. In the fully extended position, a first end A of each slot of the pair of opposed slots is horizontally aligned with one of the opposed openings formed in the peripheral wall of the substantially cylindrical elongated body. In the retracted position, a second end B of each slot of the pair of opposed slots is horizontally aligned with the opposed opening. Two separate retention pins 210 are shown in FIG. 11 as the retention element. The variable length flush nozzle 200 illustrated in FIG. 11 is in the fully extended position.

In operation, the variable length flush nozzles 100 and 200 herein described can be readily used in a manner similar to a known flush nozzle. The nozzle head thereof is slidable between the fully extended and the retracted position, and all positions therebetween, to maintain the orifice thereof on the surface of the conductive workpiece and follow the contours thereof, regardless of whether the conductive workpiece has an irregular shape and/or surface (i.e., a surface that is not perpendicular to the electrode wire). As noted previously, the lower portion of the nozzle head slides axially on (FIGS. 3 through 10) or in (FIG. 11) the upper portion of the elongated body between the fully extended and retracted positions. The pair of opposed slots and retention element are dimensioned and positioned to limit the travel of the nozzle head on the upper portion of the elongated body between the fully extended and retracted positions, i.e., the pair of opposed slots serves to define the limits of travel of the nozzle head between the fully extended and retracted positions. The variable length flush nozzle is at the maximum length when the nozzle head is in the fully extended position (FIGS. 3 through 6, 8, and 11) and the variable length flush nozzle is at the minimum length when the nozzle head is in the retracted position (FIG. 7) relative to the elongated body. The fully extended and retracted positions of the nozzle head are defined by first and second ends A and B, respectively, of the pair of opposed slots, i.e., when the nozzle head is in the fully extended position (FIGS. 3 through 6 and FIG. 8), the retention element is in contact with the first end A of the pair of opposed slots, and when the nozzle head is in the retracted position (FIG.7), the retention element is in contact with the second end B of the pair of opposed slots. It will be apparent that when the retention element is at the first end A of the pair of opposed slots as viewed in FIGS. 3-6, 8, and 11, that the nozzle head will be fully extended relative to the elongated body. When the retention element is at the second end B of the pair of opposed slots as viewed in FIG. 7, the nozzle head will be retracted relative to the elongated body. It will therefore be apparent that the relative position of the nozzle head between its limits of travel will vary the length of the variable length flush nozzle accordingly. In the illustrated embodiments, the flush nozzle length can be increased a maximum distance equal to the length of each slot, or less than the maximum distance within the limits of travel. The foregoing defined range is deemed to be satisfactory for most WEDM machines.

Slideable movement of the nozzle head between the fully extended and fully retracted positions can be effected by flushing pressure, or both flushing pressure and the mechanical spring. The nozzle head is thrust outward against the conductive workpiece due to the flushing pressure of the dielectric liquid supplied from a liquid delivery pump (not shown). The dielectric liquid is brought at a predetermined pressure to the internal chamber through the internal channel provided in the elongated body and then to the orifice in the nozzle head. As a result of such thrust or flushing pressure, the nozzle head slides axially on or in the upper portion of the elongated body to its fully extended position in which the variable length flush nozzle is at the maximum length pressing the orifice or nozzle opening against the conductive workpiece. The orifice directs the dielectric liquid toward the conductive workpiece to be machined, i.e., toward the interior of the space S created by the machining between the electrode wire and the conductive workpiece. This space, where the electrical discharges take place, is generally called a "gap". The variable length flush nozzle according to exemplary embodiments permits the nozzle head to slide axially relative to the elongated body to adjust its length to changing contours of the workpiece, enabling the variable length flush nozzle to follow the contours of the conductive workpiece and maintain equidistance thereto to maintain optimum chip flushing. As used herein, "optimum" chip flushing refers to the cutting zone being flushed with the dielectric liquid in a sufficient volume and at a sufficiently high flow rate, yet uniformly along its entire length, i.e. across the thickness of the conductive workpiece, to allow the erosive action to continue with stability, the cutting chips and other erosive products to be carried away promptly from the cutting zone, and the electrode wire subject to erosive heating to be cooled with greater effectiveness. The dielectric liquid is delivered through the pair of flush nozzles individually to surround the electrode wire and flush away the chips from the cutting zone, as illustrated in FIG. 2. As noted previously, the dielectric liquid and the chips meet in the middle of the cut where the chips move around the electrode wire, and out the path that was already cut. As noted previously, the dielectric liquid is also used to cool the electrode wire and the conductive workpiece.

If the hydraulic or flushing pressure of the dielectric liquid is not sufficient to keep the orifice in its working position against the conductive workpiece, the mechanical spring 134 illustrated in FIG. 8 may be provided in the internal chamber of the nozzle head of the variable length flush nozzle. When sufficient bias is applied to the nozzle head to overcome the resistance of the spring, the nozzle head slides toward the fully extended position in response to increased pressure to the nozzle head. Mechanical means including elastic elements other than a spring may be used.

It is to be appreciated that the variable length flush nozzle according to exemplary embodiments enables the length thereof to be self-adjusting, thereby maintaining the orifice of the nozzle head against the conductive workpiece regardless of changing contours thereof, resulting in optimum chip flushing around the electrode wire. In addition, as it is possible to maintain the orifice against the conductive workpiece, a conductive workpiece having surfaces that are not smooth or flat or are oblique can be machined by wire EDM at the highest possible speed and precision.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A variable length flush nozzle comprising:
an elongated body having an internal channel;
a nozzle head having a frustoconical tip portion and a substantially cylindrical lower portion that cooperate to define an internal chamber, with a spring received in the internal chamber so as to be positioned between the frustoconical tip portion and the elongated body, the lower portion having a pair of opposed slots formed therein, the nozzle head coupled to the elongated body by a retention element dimensioned and configured for operative engagement with the pair of opposed slots such that the nozzle head is slidable relative to the elongated body between a fully extended position in which the variable length flush nozzle is at a maximum length and a fully retracted position in which the variable length flush nozzle is at a minimum length, a length of the variable length flush nozzle configured to be continuously self adjusting as the nozzle head slides within its limits of travel between the fully extended position and the retracted position, and all positions therebetween.

2. The variable length flush nozzle of claim 1, wherein the internal channel is adapted to be connected to a source of dielectric liquid and wherein the variable length flush nozzle delivers the dielectric liquid in a wire EDM machine under flushing pressure to a cutting zone in a conductive workpiece, the orifice of the variable length flush nozzle maintained against the conductive workpiece by the flushing pressure and the spring disposed in the nozzle head.

3. The variable length flush nozzle of claim 1, wherein each slot of the pair of opposed slots has opposing first and second ends and contact between the retention element and the first end of each slot defines the fully extended position, and contact between the retention element and the second end of each slot defines the fully retracted position.

4. The variable length flush nozzle of claim 3, wherein the length of each slot defines travel limits of the nozzle head.

5. The variable length flush nozzle of claim 1, wherein the elongated body further comprises an upper portion with an outlet end and a lower portion with an inlet end and the nozzle head has the tip portion with an orifice and the lower portion defined by a peripheral wall having the pair of opposed slots formed therein, the lower portion slidable relative to the upper portion of the elongated body.

6. The variable length flush nozzle of claim 5, wherein the elongated body and the retention element comprise a single unitary structure and the retention element comprises a pair of opposed flanges extending outwardly from the upper portion of the elongated body, the lower portion slidable on the upper portion of the elongated body.

7. The variable length flush nozzle of claim 5, wherein the retention element comprises a pair of retention pins extending through opposed openings in the peripheral wall of the lower portion and through the pair of opposed slots and the lower portion is slidable in the upper portion of the elongated body.

8. A variable length flush nozzle for a wire EDM machine comprising:
an elongated body having an inlet end, an outlet end, and an internal channel configured to carry a dielectric liquid for cutting a conductive workpiece by electroerosion by means of an electrode wire, the internal channel adapted to be connected to a source of dielectric liquid; and a nozzle head having a frustoconical tip portion with an orifice and a lower portion defined by a peripheral wall having a pair of opposed slots formed therein, the frustoconical tip portion and the lower portion cooperate to define an internal chamber, with a spring received within the internal chamber so as to be positioned between the frustoconical tip portion and the elongated body, the lower portion of the nozzle head coupled to the outlet end of the elongated body by a retention element dimensioned and configured for operative engagement with the pair of opposed slots such that the nozzle head is slidable relative to the outlet end of the elongated body between a fully extended position in which the variable length flush nozzle is at a maximum length and a fully retracted position in which the variable length flush nozzle is at a minimum length, a length of the variable length flush nozzle configured to be continuously self-adjusting as the nozzle head travels slides within its limits of travel between the fully extended position and the retracted position, and all positions therebetween to maintain contact of the orifice against the conductive workpiece even if a contour of the conductive workpiece varies.

9. The variable length flush nozzle for a wire EDM machine of claim 8, wherein the length of each slot of the pair of opposed slots defines travel limits of the nozzle head.

10. The variable length flush nozzle for a wire EDM machine of claim 8, wherein the spring applies a bias along an axis that lies parallel to a plane defined by the nozzle head.

11. The variable length flush nozzle for a wire EDM machine of claim 8, wherein the nozzle head slides axially relative to the elongated body and the orifice is maintained against the conductive workpiece by flushing pressure from the dielectric liquid and the spring disposed in the nozzle head.

12. The variable length flush nozzle for a wire EDM machine of claim 8, wherein each slot of the pair of opposed slots has opposing first and second ends and contact between the retention element and the first end of each slot defines the fully extended position, and contact between the retention element and the second end of each slot defines the fully retracted position.

13. The variable length flush nozzle for a wire EDM machine of claim 8, wherein the elongated body further comprises an upper portion including the outlet end and a lower portion including the inlet end and the lower portion of the nozzle head is slidable on the upper portion of the elongated body.

14. The variable length flush nozzle for a wire EDM machine of claim 8, wherein the elongated body and the retention element comprise a single unitary structure and the retention element comprises a pair of opposed flanges extending outwardly from the upper portion of the elongated body.

15. The variable length flush nozzle for a wire EDM machine of claim 8, wherein the retention element comprises a pair of retention pins, each retention pin extending through an opening of a pair of opposed openings in the peripheral wall and received in one of the opposed slots.

16. The variable length flush nozzle for a wire EDM machine of claim 8, wherein the variable length flush nozzle delivers the dielectric liquid under flushing pressure to a cutting zone in the conductive workpiece.

17. A wire EDM machine comprising:
a pair of flush nozzles adapted to be disposed at opposite sides of a conductive workpiece and to deliver a dielectric liquid individually toward the conductive workpiece while permitting insertion of an electrode wire therethrough in the axial direction thereof coincident with delivery of the dielectric liquid into a cutting zone in the conductive workpiece, at least one of the flush nozzles of the pair of flush nozzles comprising a variable length flush nozzle, the variable length flush nozzle comprising:

an elongated body having an internal channel; and
a nozzle head having a frustoconical tip portion and a substantially cylindrical lower portion that cooperate to define an internal chamber, with a spring received in the internal chamber so as to be positioned between the frustoconical tip portion and the elongated body, the lower portion having a pair of opposed slots formed therein, the nozzle head coupled to the elongated body by a retention element dimensioned and configured for operative engagement with the pair of opposed slots such that the nozzle head is slidable relative to the elongated body between a fully extended position in which the variable length flush nozzle is at a maximum length and a fully retracted position in which the variable length flush nozzle is at a minimum length, a length of the variable length flush nozzle configured to be continuously self adjusting as the nozzle head slides within its limits of travel between the fully extended position and the fully retracted position, and all positions therebetween.

18. The wire EDM machine of claim 17, wherein each slot of the pair of opposed slots has opposing first and second ends and contact between the retention element and the first end of each slot defines the fully extended position, and contact between the retention element and the second end of each slot defines the fully retracted position.

19. The wire EDM machine of claim 18, wherein the length of each slot defines travel limits of the nozzle head.

20. The wire EDM machine of claim 18, wherein the nozzle head has a tip portion with an orifice, the orifice maintained against the conductive workpiece by flushing pressure and the spring disposed in the nozzle head.

* * * * *